(12) United States Patent
Kawaguchi

(10) Patent No.: US 6,301,518 B1
(45) Date of Patent: Oct. 9, 2001

(54) EDITING DEVICE OF PATCH WORK PIECES AND A RECORDING MEDIUM FOR STORING PROGRAMS TO OPERATE THE EDITING DEVICE

(75) Inventor: Takeshi Kawaguchi, Kounan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/249,132

(22) Filed: Feb. 12, 1999

(30) Foreign Application Priority Data

Feb. 12, 1998 (JP) .................................................. 10-029794

(51) Int. Cl.[7] .................................................. G06F 19/00
(52) U.S. Cl. ........................................... 700/131; 700/135
(58) Field of Search .................................... 700/130, 131, 700/132, 133, 136, 137; 112/102.5, 470.06, 470.04, 445, 470.05

(56) References Cited

U.S. PATENT DOCUMENTS

| 4,622,907 | * | 11/1986 | Kimura | 112/103 X |
| 5,231,586 | * | 7/1993 | Shimizu | 700/138 |
| 5,751,583 | * | 5/1998 | Kyuno et al. | 700/138 |
| 5,855,176 | * | 1/1999 | Takenoya et al. | 700/138 |
| 6,173,211 | * | 1/2001 | Williams et al. | 700/131 |

* cited by examiner

Primary Examiner—Peter Nerbun
(74) Attorney, Agent, or Firm—Oliff & Berridge, PLC

(57) ABSTRACT

The invention relates to an editing device for patch work pieces. In the editing device, an operator edits all patch work pieces that make up a patch work piece product on a display device. The operator edits the figure and the pattern of the patch work pieces on the display device and instructs a fabric printer to print out the edited patch work pieces directly on a cloth or a fabric. As a result, the operator can easily obtain actual patch work pieces the same as the edited patch work pieces shown on the display device without using paper patterns.

20 Claims, 13 Drawing Sheets

Fig.11A      Fig.11B
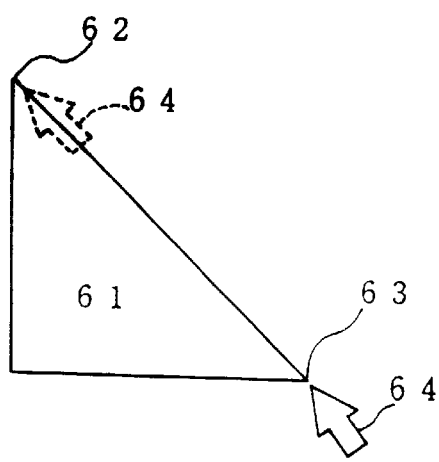
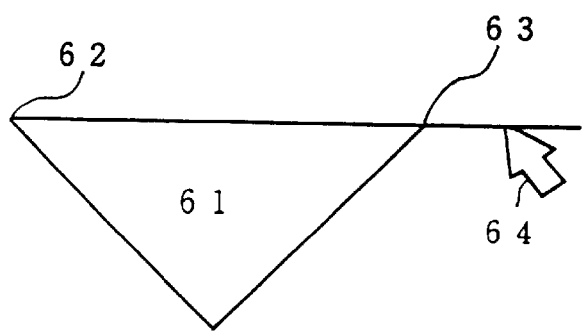
Fig.12A      Fig.12B      Fig.12C
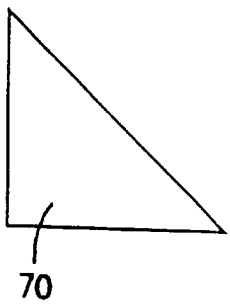
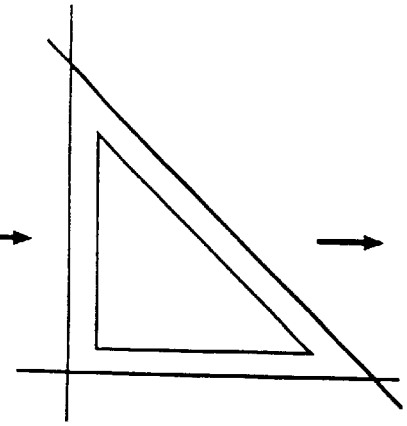
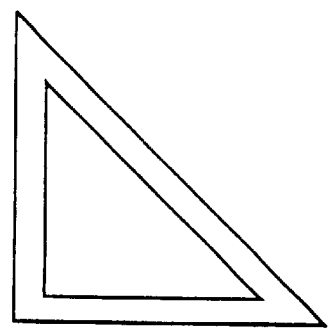

EDITING DEVICE OF PATCH WORK PIECES AND A RECORDING MEDIUM FOR STORING PROGRAMS TO OPERATE THE EDITING DEVICE

BACKGROUND OF THE INVENTION

1. Field of Invention

This invention is related to an editing device of patch work pieces. More particularly, it is related to the editing device which edits the form (or the shape) and the pattern of each patch work piece composing patch work piece products, and which prints out each edited patch work piece with patterns on a cloth or a fabric directly.

2. Description of Related Art

Conventionally, an editing device of a patch work piece is well known. In this editing device, the operator can edit the form (or the shape) and the pattern of patch work pieces which compose a patch work piece product on a display device, and then the operator makes the editing device print out the edited patch work piece as a paper pattern to the printing device, such as a plotter and a printer.

More particularly, in this editing device, the operator first compiles the form of the each patch work piece on the display device. The operator initially chooses a pattern of the cloth or fabric, such as stripe, check, solid, and floral, from a pattern library stored, in advance, in a memory unit. This allows the operator to edit the form and dimension with respect to the fabric pattern of each patch work piece on the display device. Finally, the operator instructs the printing device to output the edited patch work pieces as a dress pattern paper (hereafter, referred to as a paper pattern).

However, the conventional editing device could only output a plain paper pattern, without the fabric pattern, of each patch work piece. Therefore, when the operator uses the paper pattern, the operator must place the paper pattern directly on a cloth or a fabric and achieve a proper orientation. This is difficult as the fabric pattern is not on the paper pattern which only has form (or shape) and size (or dimension). Then, the operator transcribes the form of patch work piece with a marker, such as marking pen or marking chalk, by marking the circumference of the paper pattern on the cloth or the fabric. The operator produces the pieces for actually creating the patch work piece product by cutting the cloth or the fabric along the marks. Thus, it takes a long time for the operator to create the patch work piece.

Because the pattern printed as the paper pattern was created using a cloth pattern library stored in the memory unit provided at the conventional editing device, there are two ways for the operator to actually get all the patch work pieces from the cloth or the fabric.

One way is for the operator to look for a cloth or a fabric having a similar pattern design as the pattern from the memory being used to create the paper pattern. When the operator finds the cloth or the fabric having the similar pattern, the operator places the paper pattern on the similar pattern portion of such a cloth or fabric. The operator then produces all the patch work piece patterns, and then the patch workpieces, in the same way as previously discussed.

A second way is for the operator to add the actual cloth pattern or the actual fabric pattern to the pattern library in the memory unit provided at the conventional editing device by, for example, capturing the cloth pattern or the fabric pattern using a scanner. Then, the operator edits the patch work pieces, using the captured pattern and obtains a paper pattern with the captured pattern. Finally, the operator produces all patch work pieces as discussed.

In the case where the operator gets the patch work piece from no-pattern cloth (no-pattern fabric) or detailed (minute) pattern cloth (detailed pattern fabric) using a paper pattern, the operator need not care where the paper pattern is placed on the cloth or the fabric because there will be no effect to final design of the patch work piece products even if the operator cuts the patch work pieces from any part of the cloth or the fabric. However, in case that the operator cuts the patch work piece from the cloth or the fabric having a large pattern using the plain paper pattern, the operator must position the paper pattern on the cloth or the fabric having a large pattern very accurately. If the paper pattern is not positioned accurately, the final patch work design will be quite different from the operator's desired pattern as the cut piece will not match properly with an associated piece. Accurately positioning the paper pattern on the cloth or the fabric having a large pattern is very difficult and takes much time because the paper pattern itself is plain and there is nothing to help orient the paper pattern to the fabric pattern. Further, in the case of using cloth or fabric having a large pattern, the patch work pieces are cut from only the desired portion of the cloth or the fabric. Thus, efficiency of use is very poor with considerable waste of the cloth or fabric.

SUMMARY OF THE INVENTION

The invention is directed at solving the problems mentioned above. An object of the invention is to provide an editing device for the patch work piece for easily created actual patch work pieces the same as the edited patch work pieces, created on the display device by the operator.

In order to achieve the above object, an editing device of the invention comprises image data storage means for storing a plurality of fabric pattern image data; patch work piece data storage means for storing a patch work piece data having piece figure data indicating a figure of pieces composing a patch work piece product, a margin figure data indicating the margin figure set to each patch work piece, a piece pattern data indicating a pattern set to each patch work piece; display means for displaying a fabric pattern image data stored in the image data storage means and a plan of a patch work piece product of the patch work piece data stored in the patch work piece data storage means; pattern setting means for setting a fabric pattern chosen from fabric pattern image data stored in said image data storage means to patch work piece data stored in said patch work piece data storage means; print data creating means for creating a margin figure in which at least the inside of a patch work portion of a patch work piece figure with a margin is filled with a pattern set by the pattern setting means, and for locating it as print data in accordance with the patch work piece data stored in the patch work piece data storage means; and fabric print means for printing a margin figure with a fabric pattern on a fabric based on the edited print data.

According to the editing device of the invention thus structured, the operator can easily create actual patch work pieces the same as the edited patch work pieces on the display device without using paper patterns or a scanner.

BRIEF DESCRIPTION OF THE DRAWINGS

A preferred embodiment of the invention will be described in detail with reference to the following figures wherein:

FIGS. 11A–11B are drawings in which the print direction setting process is shown;

FIGS. 12A–12C are drawings in which the margin setting process is shown;

DETAILED DESCRIPTION OF PREFERRED EMBODIMENTS

Referring to the accompanying drawings, a preferred embodiment of the invention will be described in detail.

Figure 1:
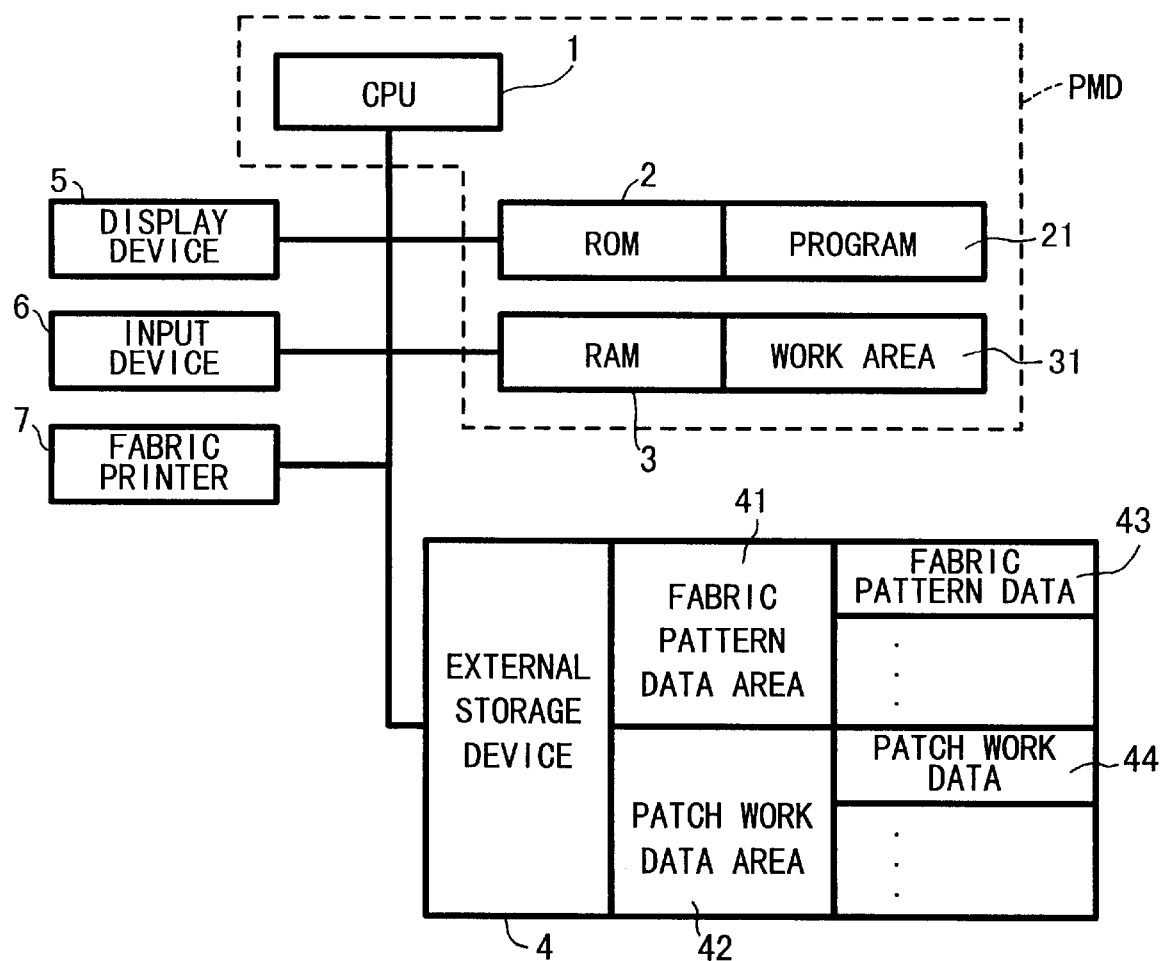
FIG. 1 is the system configuration of an editing device in the embodiment.

First, the structure of an editing device of patch work pieces will be described with reference to FIG. 1.

The editing device comprises a main device PMD, an external storage device 4, a display device 5, an input device 6, and a fabric printer 7. All devices are electrically connected (for example, by connection cables). However, the devices may be a single, unified or integrated apparatus. In case of an integrated apparatus, other devices may be connected thereto with wires or in a wire-less state (for example, using infrared signals).

CPU 1, ROM 2, and RAM 3 are provided in the main device PMD. CPU 1 executes a numeric process as the editing device in accordance with programs 21 stored in ROM 2 with an operator's instruction input from input device 6, described later. RAM 3 comprises a work area 31 for CPU 1 when CPU 1 executes the numeric process in accordance with the programs 21 stored in ROM 2.

Figure 2A:
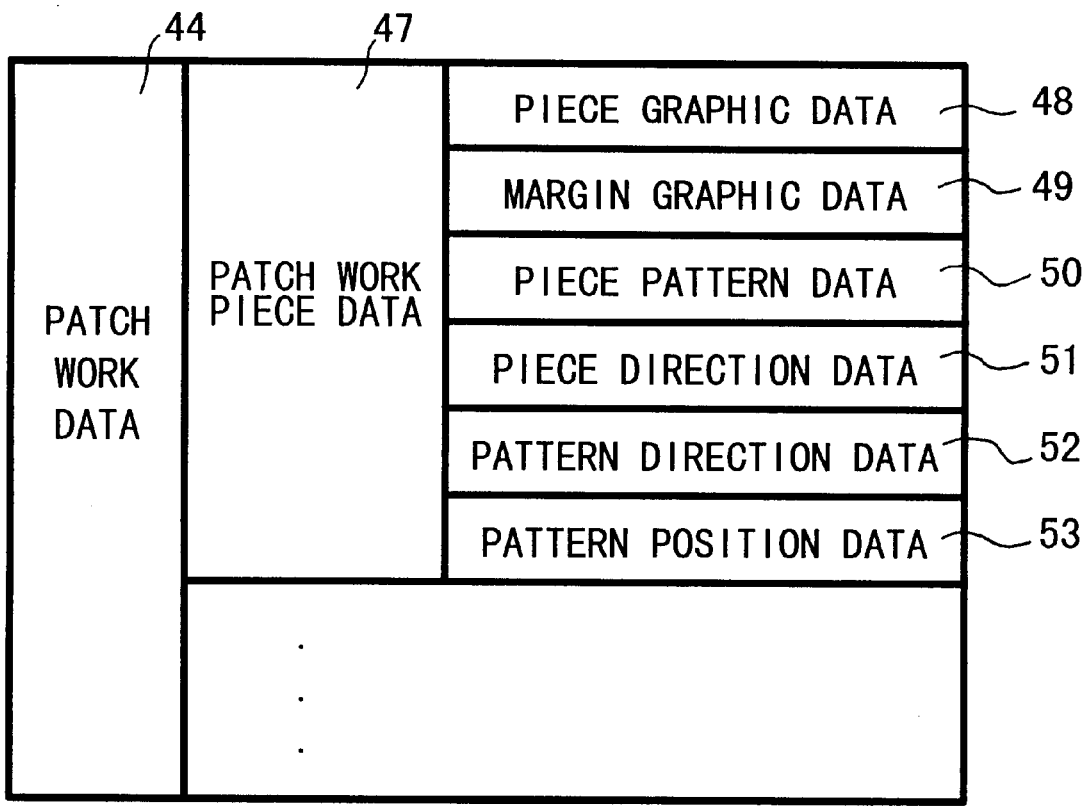
FIGS. 2A and 2B are a detailed configuration of the patch work piece data.

External storage device 4 comprises fabric pattern data area 41 and patch work data area 42. The fabric pattern data area 41 stores a plurality of fabric pattern data 43 which indicates a fabric pattern to be assigned to a patch work piece. The patch work data area 42 stores a plurality of patch work data 44. One data part of the patch work data 44 comprises a plurality of patch work piece data 47 such as shown in FIG. 2A.

The display device 5, for example, CRT (cathode-ray tube) display or LCD (liquid crystal display) displays a patch work piece under editing, a patch work piece pattern which is under editing or completed, a plan of patch work product which is under editing or completed, and a menu image for the editing.

The input device 6 comprises a pointing device (for example, a keyboard, ten keys or cursor keys thereof, a mouse cursor, a track ball, a pointing stick, a cross cursor, and/or a touch panel). The operator of the editing device can input a variety of instructions for the operational functions of the editing device.

Fabric printer 7 (for example, an ink jet printer or a thermal transfer printer) prints the patch work pieces, as edited by the operator on the display device 5, directly on a cloth or a fabric. Any printer which can print the forms (or figures) or the patterns of the patch work pieces (including margin area) on the cloth or the fabric directly may used as a fabric printer 7 in this embodiment.

Figure 2B:
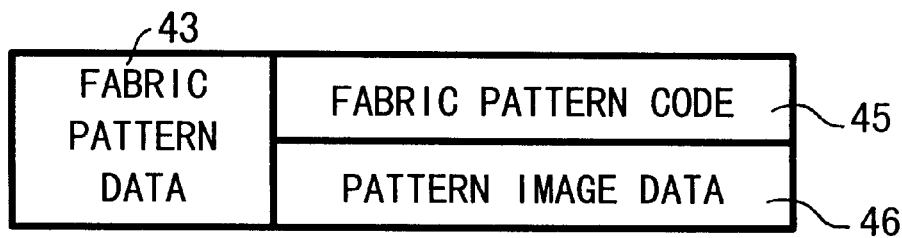

Next, the structure of fabric pattern data 43 and patch work data 44 will be described with reference to FIGS. 2A–2B.

The fabric pattern data 43 for a fabric pattern comprises a fabric pattern code 45 which distinctively identifies each fabric pattern and pattern image data 46 which defines, or produces, the image of fabric pattern. A plurality of fabric pattern data 43 are stored in advance in fabric pattern data area 41 provided in external storage device 4 as described above. A new fabric pattern an operator desires to add can be so done by capturing the fabric pattern of the cloth or fabric using a scanner or by reading in data from an external data source to the fabric pattern data area 41.

The patch work data 44 comprises a plurality of patch work piece data 47. Each patch work piece data 47 contains data of one patch work piece which composes a patch work piece product. Each patch work piece data 47 comprises a piece graphic data 48, graphic data for a margin to sew (hereafter, referred to generally as a margin graphic data) 49, piece pattern data 50, piece direction data 51, pattern direction data 52, and pattern position data 53. Piece graphic data 48 contains a form (or a figure) and a dimension of the patch work piece. Margin graphic data 49 includes final graphic data of the patch work piece to which is added the sewing margin to the piece graphic data 48. The piece pattern data 50 indicates a pattern to be printed on the piece; the piece direction data 51 indicates the direction of the patch work piece to be printed on a cloth or fabric; the pattern direction data 52 indicates the direction of the pattern to be added to the piece; and the pattern position data 53 indicates the position of the pattern to be printed on the piece. The data 48–53, if stored in an external storage device 4, are rewritten in accordance with the operator's indication, via input device 6.

Figure 3:
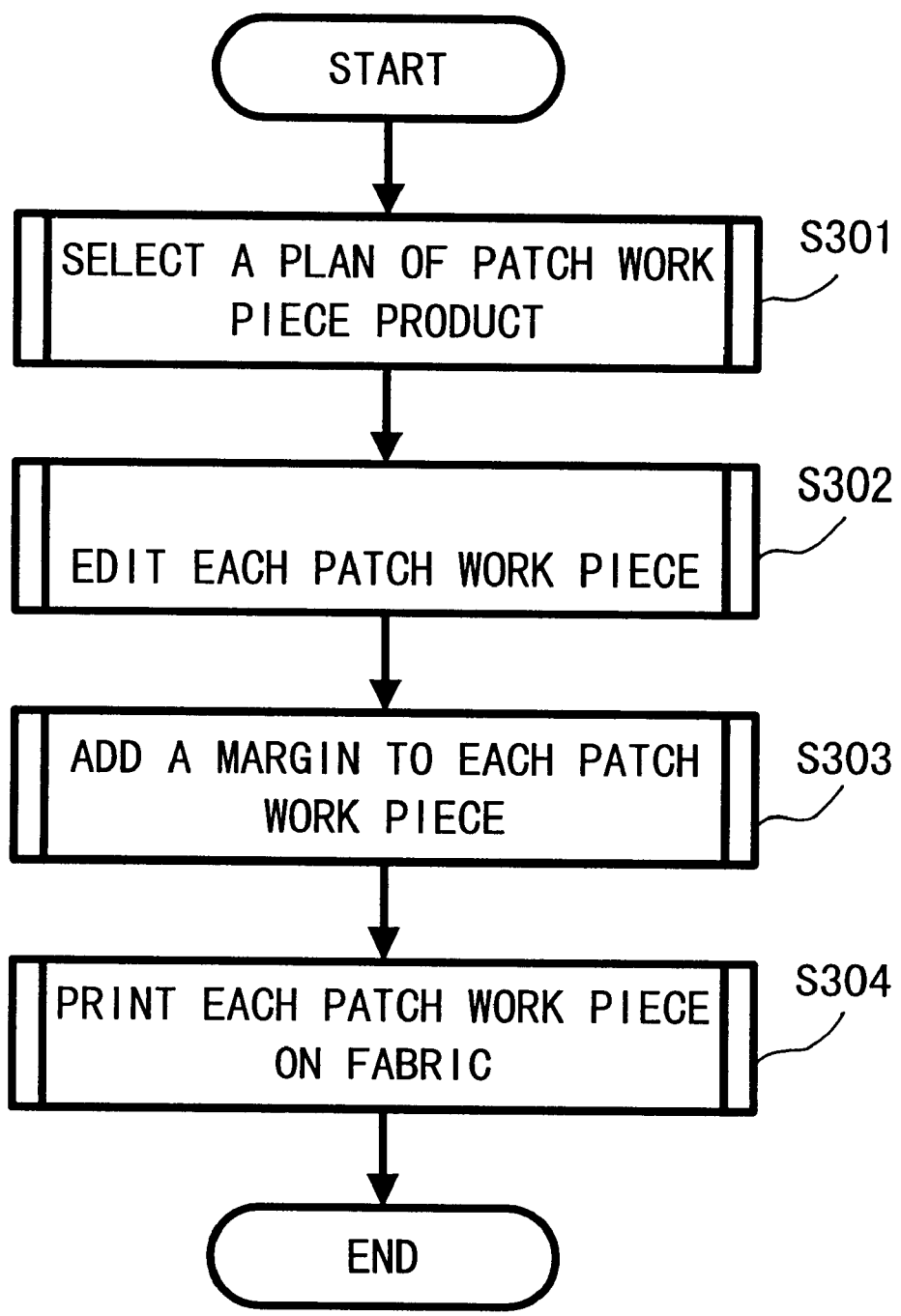
FIG. 3 is an outline flowchart of the operative flow of the editing device.

Next, the procedural flow in the editing device will be described using the outline flowchart of FIG. 3.

Figure 13:
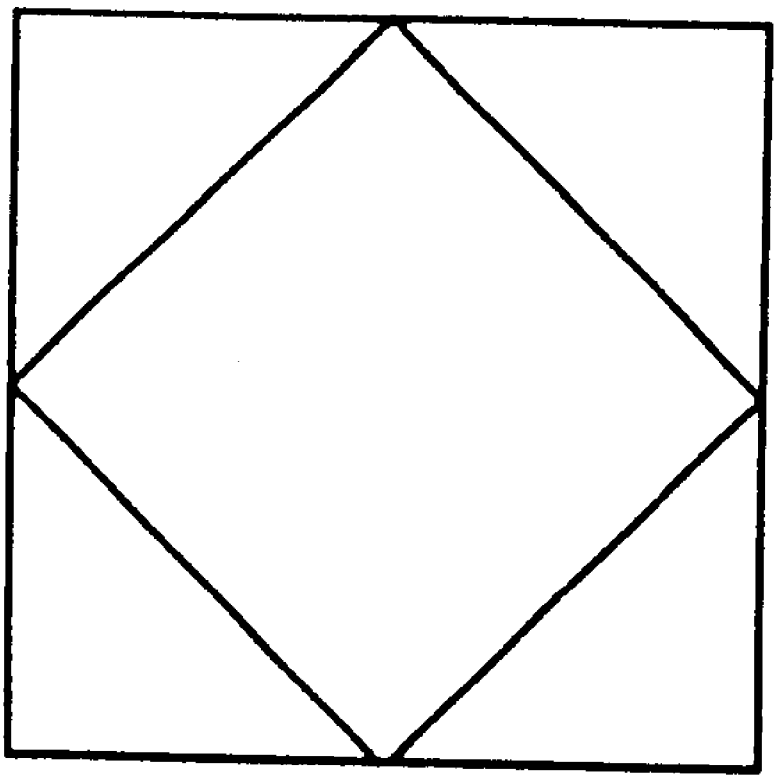
FIG. 13 is an outline view which shows a selected plan of patch work product.

First, the operator starts the editing device. The editing device is entered into an editing mode of patch work piece. Then, the editing device displays a plurality of plans of the patch work piece product on the display device 5. The plans are shown on the display only as line drawings without color and fabric pattern. The operator chooses a desired plan (as shown in FIG. 13, for example) from the plans thereof with the input device 6 in step S301. (Hereafter all steps are referred to with the prefix "S".)

In S302, the operator edits each patch work piece that makes up the patch work piece product as chosen in S301. At S302, the multiple editing process (for example, a setting process for dimension or pattern of the patch work piece and/or a setting process for print direction) are executed.

Further, in S303, the operator sets an indispensable sewing margin to each patch work piece edited in S302 on the display device 5.

Finally, the editing device outputs data for each patch work piece edited in the above-described steps to a fabric printer 7 in accordance with the operator's instruction and the fabric printer 7, in S304, prints the edited data as a plurality of patch work pieces directly on the cloth or fabric.

Hereafter, each step S301–S304 will be described in detail.

Figure 4:
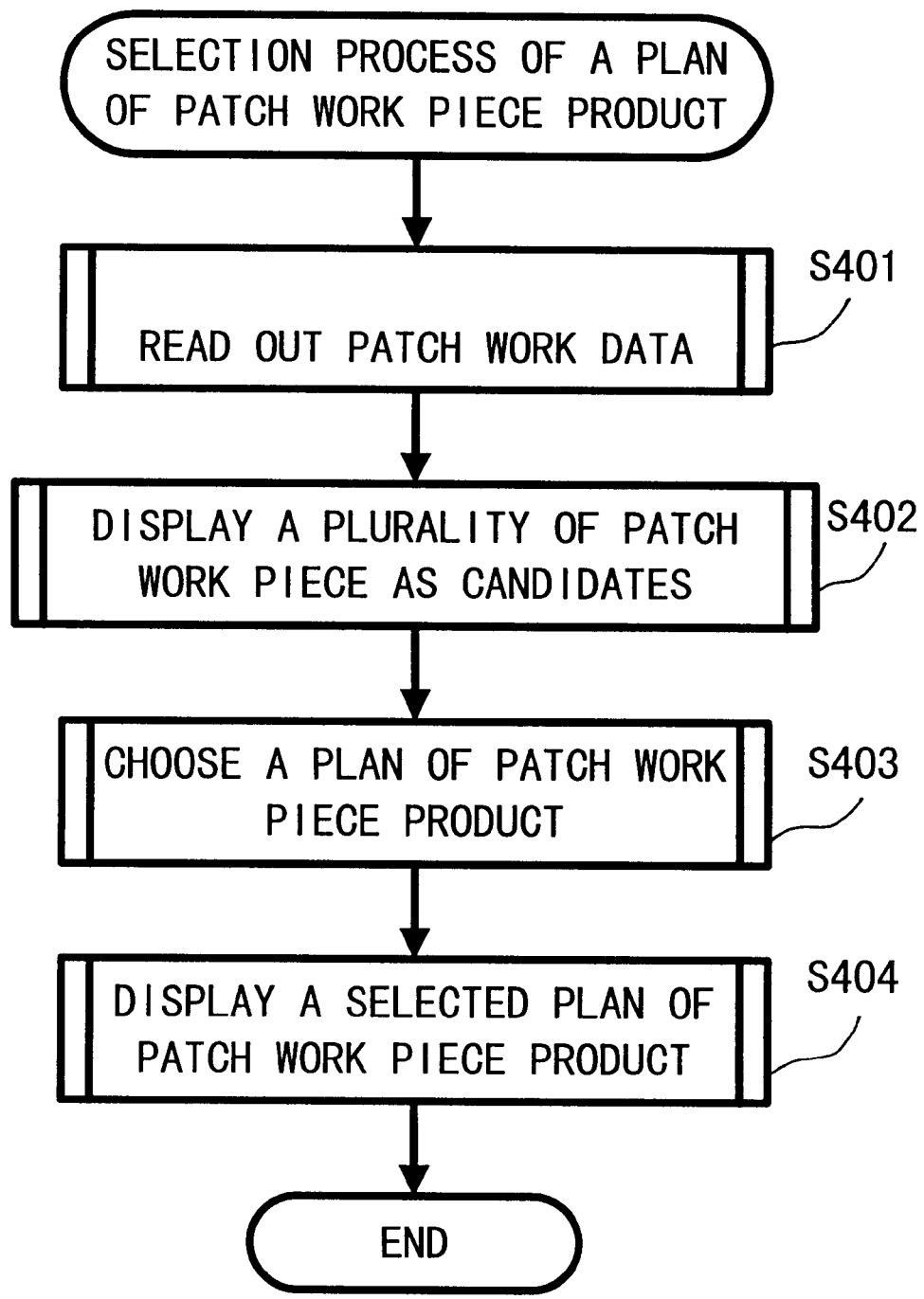
FIG. 4 is a flowchart which shows the selecting process of a plan of patch work piece product.

Firstly, S301 (selecting process of a plan of patch work piece product) will be described referring to FIG. 4. Further, a mouse cursor (generally called mouse) is used as the preferred input device 6 in this embodiment.

CPU 1 reads out the patch work data 44 stored in patch work data area 42 of an external storage device 4 in S401 and displays a plurality of minimized images corresponding to each patch work data 44 as candidates for selection in S402. In this case, all minimized images may be displayed on the display device 5, or some of the minimized images may be displayed on the display device 5 in a display scroll or page scroll mode. The operator operates the mouse to choose one of the plans of a patch work piece product in S403. Then, the CPU 1 expands the plan of the patch work product chosen by the operator and displays it in an editable state on the display device 5 in S404. In this embodiment, the operator chooses an outline plan for a patch work product, that is, there is no cloth or fabric pattern represented at this point, as shown in FIG. 13.

Figure 5:
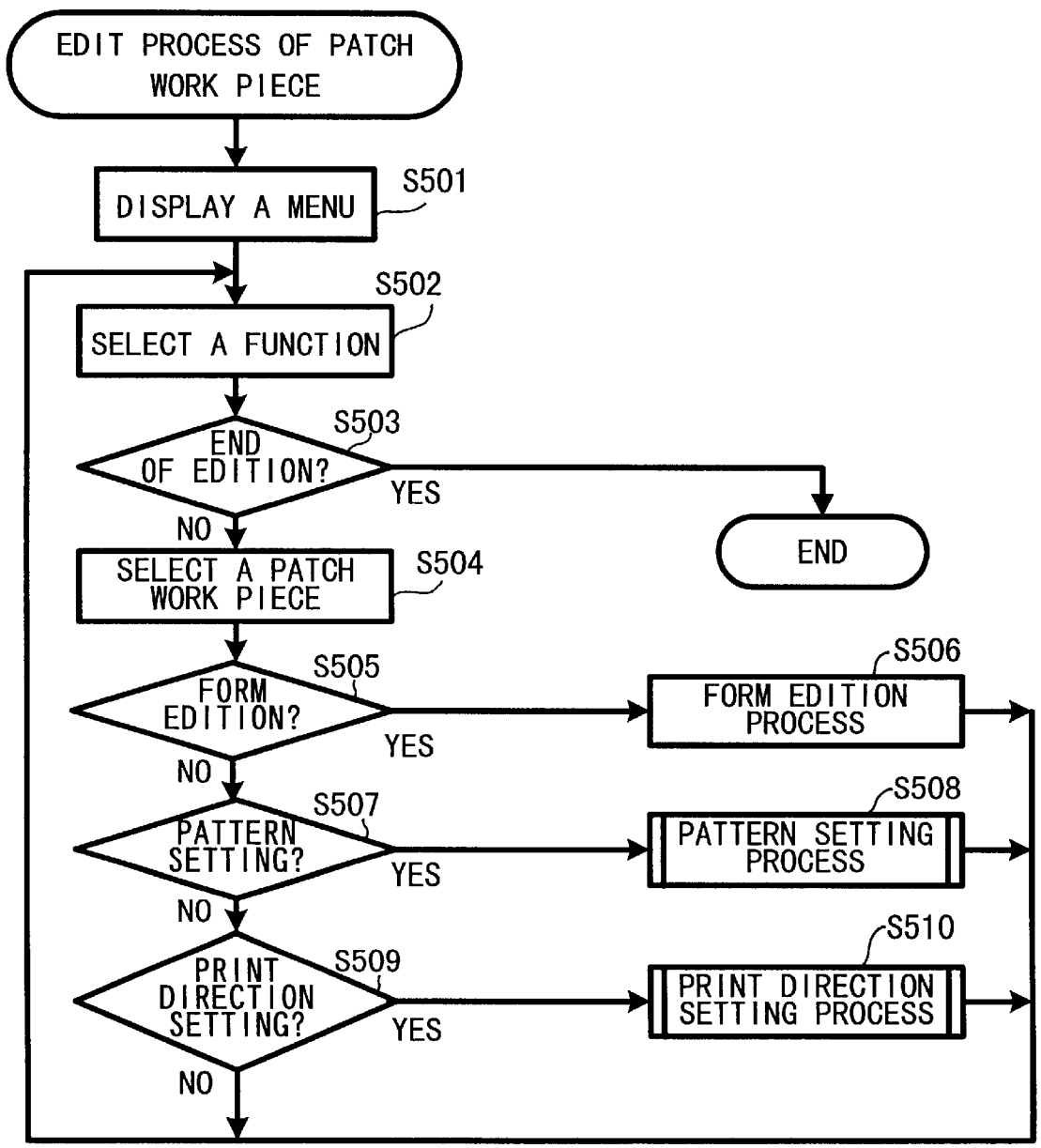
FIG. 5 is a flowchart which shows the editing process of the patch work piece.
Figure 6:
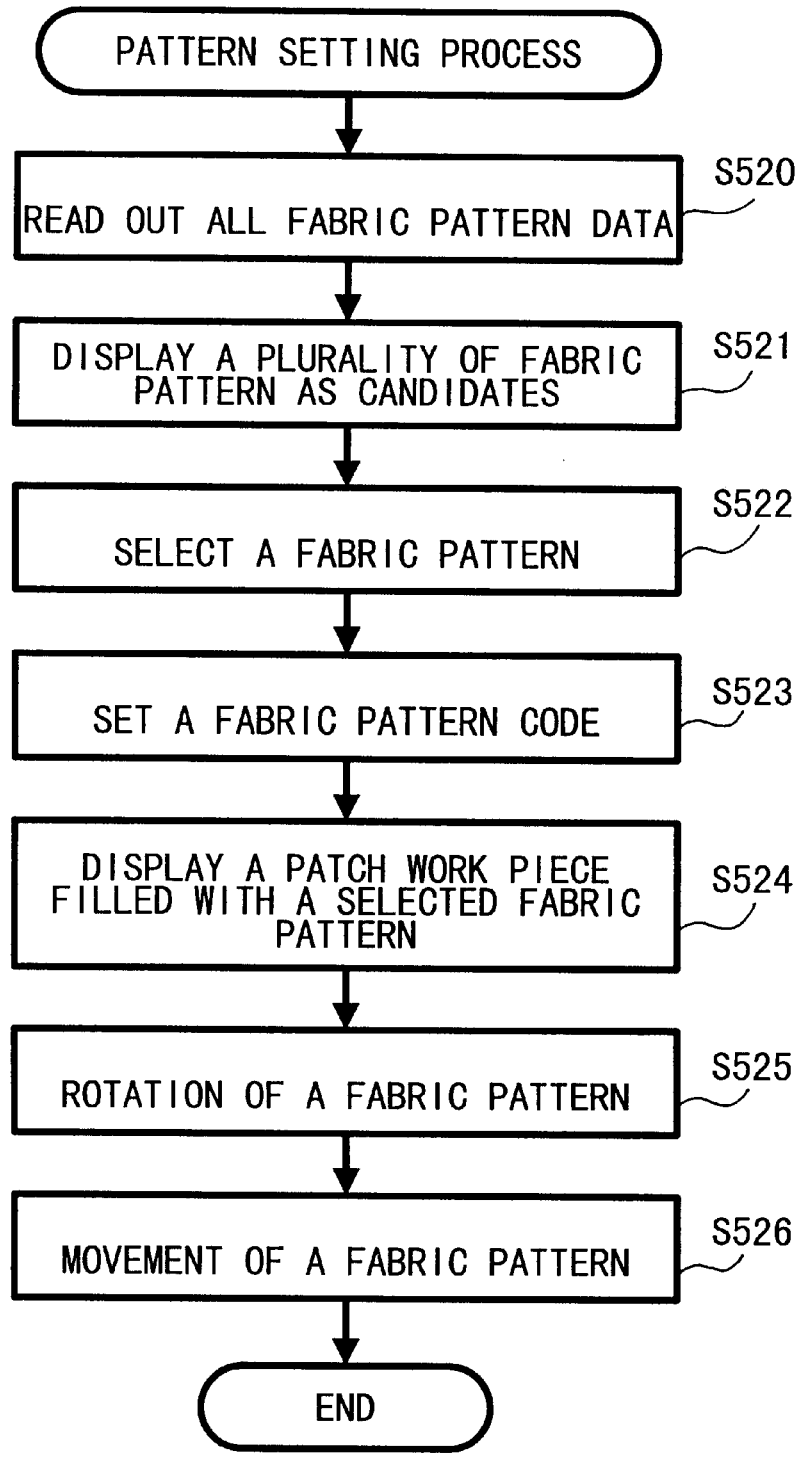
FIG. 6 is a flowchart which shows the pattern setting process of the patch work piece.

Next, S302 (editing process of each patch work piece) will be described in detail referring to FIG. 5.

A menu image (not shown) of a plurality of functions which are executable in the editing process is displayed on the display device 5 in S501. Then, in S502, the operator operates the mouse and chooses one function from the menu displayed. The CPU 1 determines, in S503, whether the function chosen by the operator in S502 is "end". When the CPU 1 determines that the chosen function is "end" (S503:Yes), the CPU 1 closes S302, the editing process. When the CPU 1 determines that the chosen function is not "end", that is, the operator chooses an edit function (S503:No), CPU 1 causes a display on the display device 5 of a message prompt to the operator to choose the patch work piece to be edited by using the mouse. The operator chooses the patch work piece to be edited in S504. When the operator chooses a patch work piece to be edited, the CPU 1 determines, in S505, whether the function chosen by the operator in S502 is "form edition". When the CPU 1 determines that the function chosen by the operator in S502 is "form edition" (S505:Yes), the CPU 1 executes the form editing process of piece graphic data 48 (S506), and then returns to S502. "Form edition" means setting the form and the dimensions of the chosen patch work piece.

When the CPU 1 determines that the function chosen by the operator in S502 is not "form edition" (S505:No), the CPU 1 further determines, in S507, whether the function chosen by the operator in S502 is "pattern setting". When CPU 1 determines that the function chosen by the operator in S502 is "pattern setting" (S507:Yes), the CPU 1 executes a pattern editing process of piece pattern data 50 (S508), and then returns to S502. "Pattern setting" means setting the pattern of the patch work piece.

When CPU 1 determines that the function chosen by the operator in S502 is not "pattern setting" (S507:No), the CPU 1 further determines, in S509, whether the function chosen by the operator in S502 is "print direction setting". When the CPU 1 determines that the function chosen by the operator in S502 is "print direction setting" (S509:Yes), the CPU 1 executes print direction editing process (S510), and then returns to S502. "Print direction setting" means that the setting position of each patch work piece is relative to the configuration of the fabric pattern.

When the CPU 1 determines that the function chosen by the operator in S502 is not "print direction setting" (S509:No), the CPU 1 returns to S502.

And then, the operator chooses the next patch work piece to be edited in S504. When the operator finishes all processes ("form edition" process, "pattern setting" process, and "print direction setting" process) for all patch work piece(s), the operator chooses the "end" function from the menu image on display device 5 as described above (S503:Yes). Then, the CPU 1 closes S302, the editing process.

Next, the pattern setting process (S508) will be described in detail referring to FIGS. 6 and 10A–10C.

Figure 10:
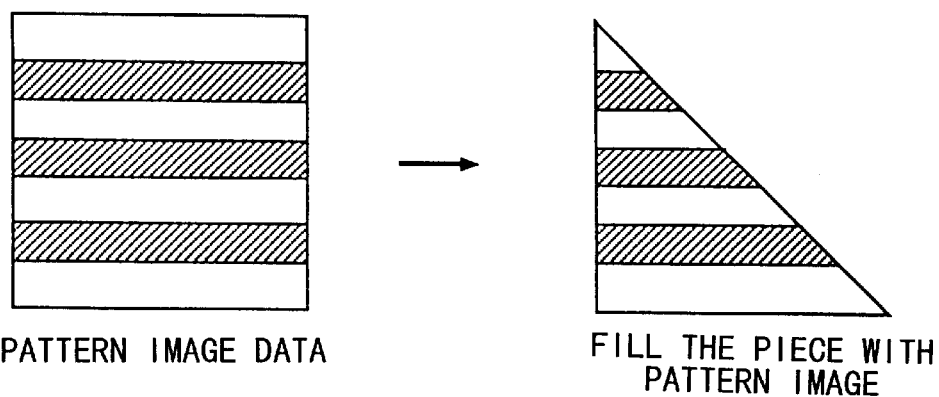
FIGS. 10A–10C are drawings in which each pattern setting process is shown.
Figure 10:
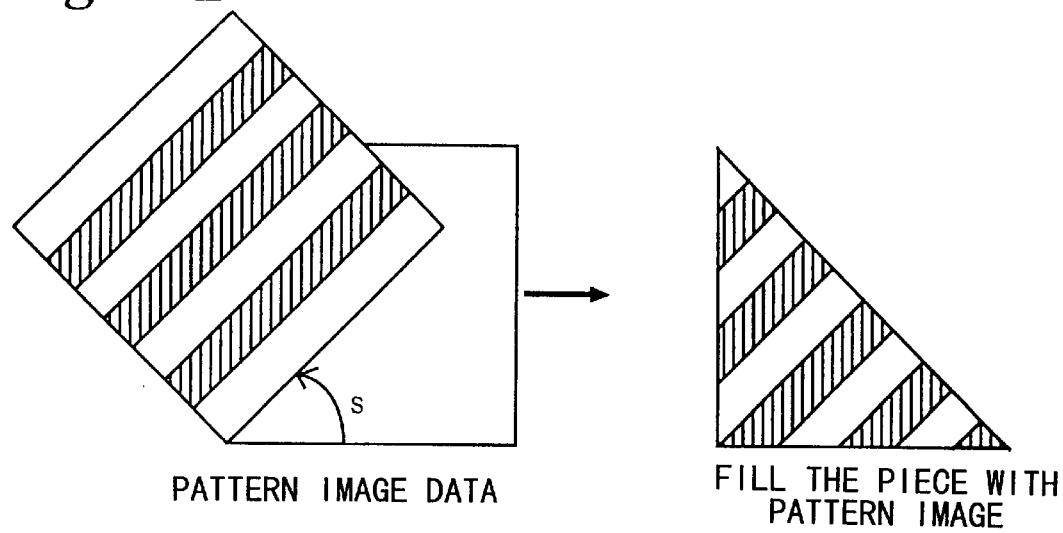
Figure 10:
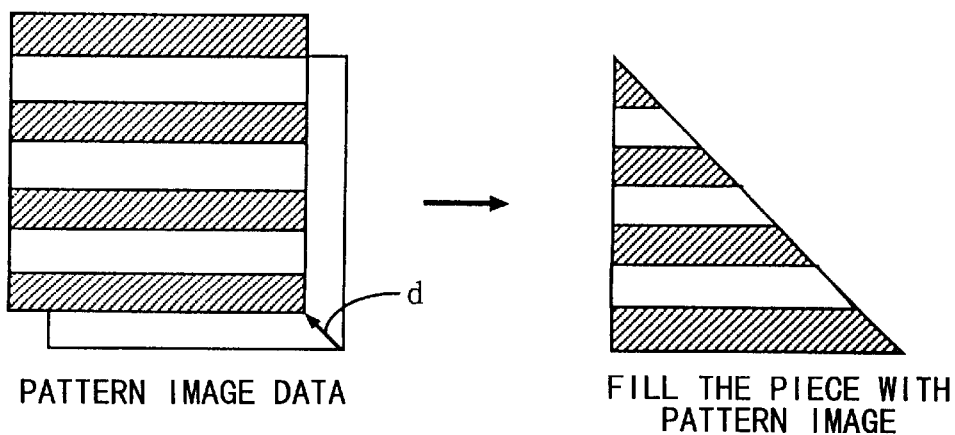

In S508, the CPU 1 reads out all the fabric pattern data 43 stored in the fabric pattern data area 41 in the external storage device 4 in accordance with the operator's selection (S520). The readout fabric pattern data 43 are displayed on the display device 5 as candidates for selection in S521. In this case, all cloth or fabric patterns corresponding to fabric pattern data 43 may be displayed on the display device 5 or only a portion of the cloth or fabric patterns may be displayed at one time and the display device 5 scrolled or page scrolled to display additional cloth or fabric patterns. The operator operates the mouse to choose a fabric pattern in S522, the CPU 1, in S523, sets fabric pattern code 45 corresponding to the chosen fabric pattern to the piece pattern data 50 of the patch work piece chosen in S504. Then, the CPU 1 fills the displayed patch work piece, on the display device 5, with the chosen fabric pattern corresponding to pattern image data 46 of fabric pattern data 43 selected in S522. The displayed result, in S524, is as shown in FIG. 10A. The hatching of FIG. 10A does not indicate a metal cross section, rather a part of the fabric pattern. Hereafter, any slant line portion drawn in a figure indicates a part of a fabric pattern. When the operator needs to edit the pattern, the operator can set the rotation (S525) and/or the movement (S526) of pattern image data 46. To set the rotation of pattern image data 46 to patch work piece, the operator indicates a rotation amounts of the pattern image data 46. As a result, the rotation amount s is set as pattern direction data 52 of the patch work piece data 47. The operator then uses the rotated pattern image data 46 to fill the rotated patch work piece pattern in the same manner as S524 (FIG. 10B). In S526, when the operator sets the movement of pattern image data 46 to each patch work piece, the operator indicates movement amount d of the pattern image data 46. As a result, the movement amount d is set as pattern position data 53 of the patch work piece data 47. Then, the operator causes the moved pattern image data 46 to fill the pattern of the patch work piece in the same manner as S524 (FIG. 10C).

Figure 7:
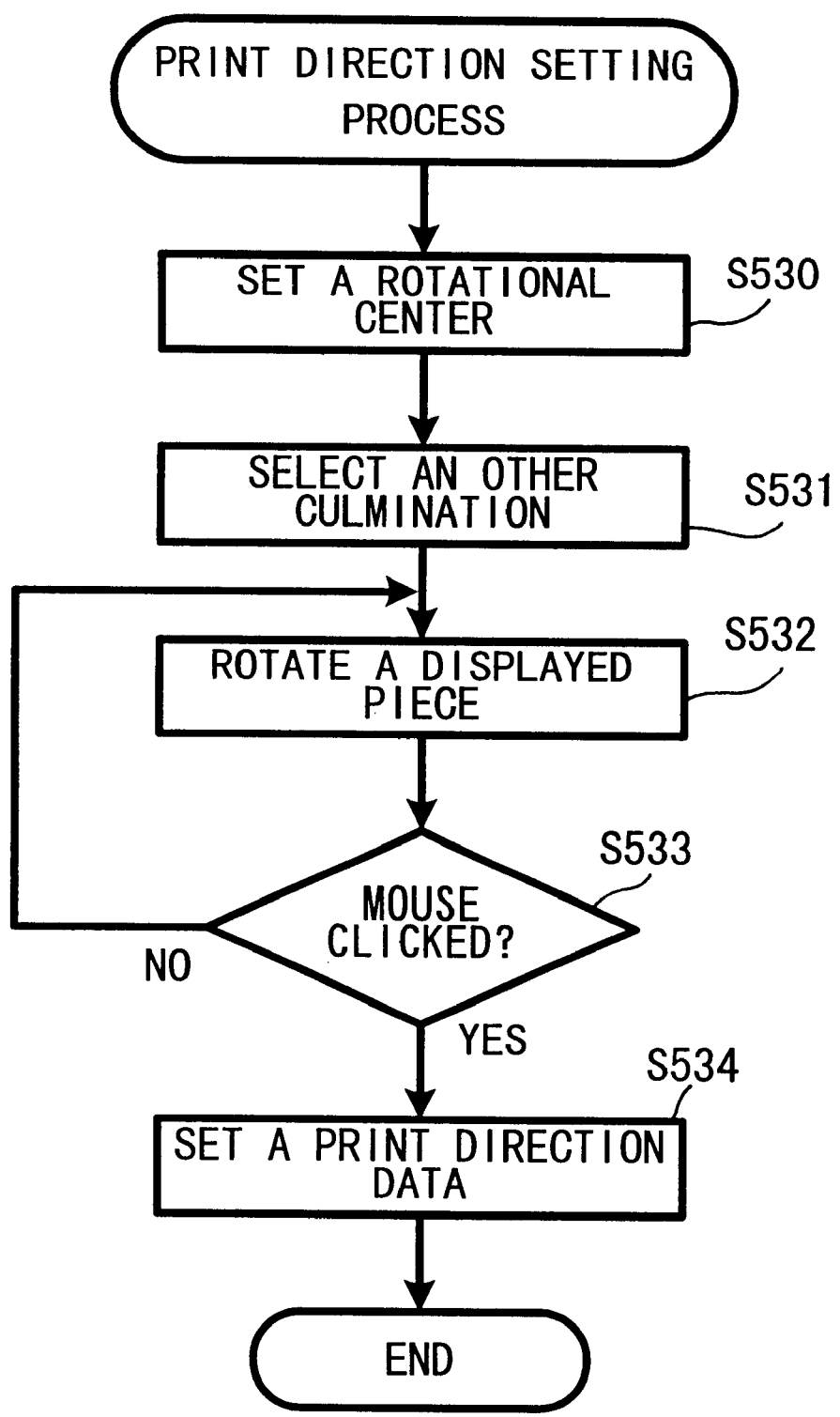
FIG. 7 is a flowchart which shows the print direction setting process of the patch work piece.

Next, the print direction setting process of S510 will be described in detail referring to FIGS. 7 and 11A, 11B. In this embodiment, the print direction corresponds to the downward direction of the display device 5 and the print direction is the same as the lengthwise grain direction of the fabric. Generally, the lengthwise grain direction of the fabric means a longitudinal thread (warp) direction. The print direction data is set as an angle from the downward direction of the lengthwise grain direction in a counterclockwise direction.

The operator, in S530, operates the mouse and chooses one clearly defined point 62, for example, a corner, of patch work piece FIG. 61 corresponding to the pattern of the patch work piece set in S508 (the fabric pattern image is omitted in FIGS. 11–12) as a rotational center using the cursor 64 (broken line) on the display device 5 (shown in FIG. 11A).

Next, the operator, in S531, chooses another clearly defined point 63 of patch work piece FIG. 61 using the cursor 64 (continuous line) controlled by the mouse (shown in FIG. 11A). Then, the operator moves the mouse and rotates the patch work piece FIG. 61, in S532, by locating the point 63 on the line from the point 62 to cursor 64 (shown in FIG. 11B). The operator continues the rotation until clicking a designated button of the mouse (S533:No). When the operator clicks the button of the mouse (S533:Yes), the CPU 1 sets, in S534, the rotation amount of patch work piece FIG. 61 as the piece direction data 51 of the patch work piece.

Figure 8:
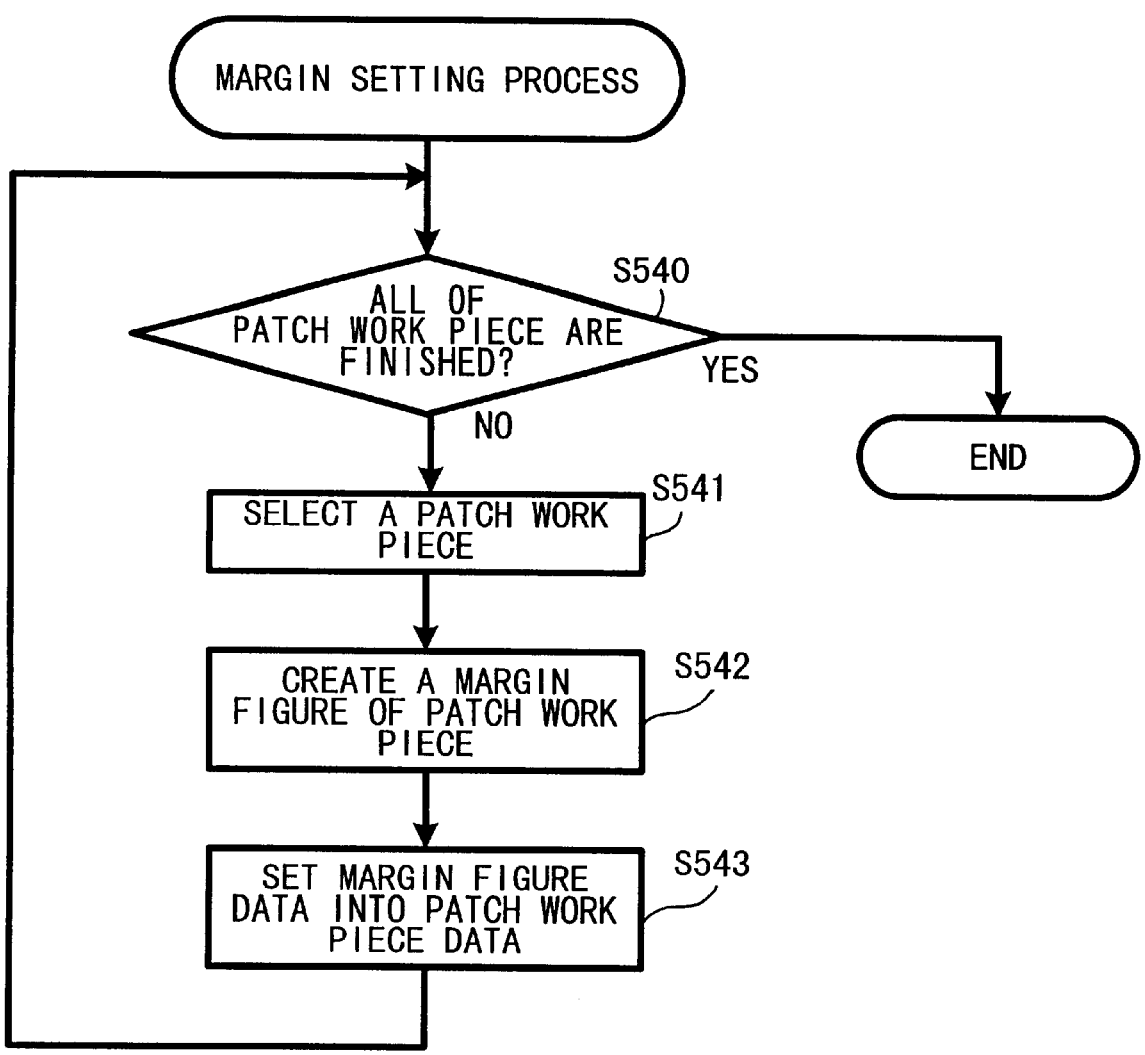
FIG. 8 is a flowchart which shows the margin setting process of the patch work piece.

Next, a sewing margin setting process (S303) will be described in detail referring to FIGS. 8 and 12.

The CPU 1 determines whether the operator has finished the sewing margin setting process for all of the patch work pieces chosen by the operator in S540. When CPU 1 determines that margin setting process for all of the patch work pieces is finished (S540:Yes), the CPU 1 closes S303. When CPU 1 determines that margin setting process for all of the patch work pieces is not yet finished (S540:No), the CPU 1 chooses a patch work piece 70 from the non-edited patch work pieces, i.e. those for which editing is not complete, in S541. Then, the CPU 1 extracts all basic segments (FIG. 12A) to compose the piece graphic data 48 of the selected patch work piece. The CPU 1 sets the margin lines based on the basic segments. The margin lines are positioned at a predetermined margin for sewing from all the basic segments in an external direction (FIG. 12B). Then, the CPU 1 connects the intersection points of the adjoined margin lines. The connected intersection points indicate a figure having a margin for sewing (hereafter, referred to as a margin figure) (FIG. 12C). The margin for sewing, or sewing margin, is that material that extends outside the stitch line to provide a seam allowance. The CPU 1, in S542, stores data indicating the margin figure as margin graphic data 49. Then, CPU 1 sets the margin graphic data 49, S543, as patch work piece data 47 of the patch work piece and returns to S540.

Figure 9:
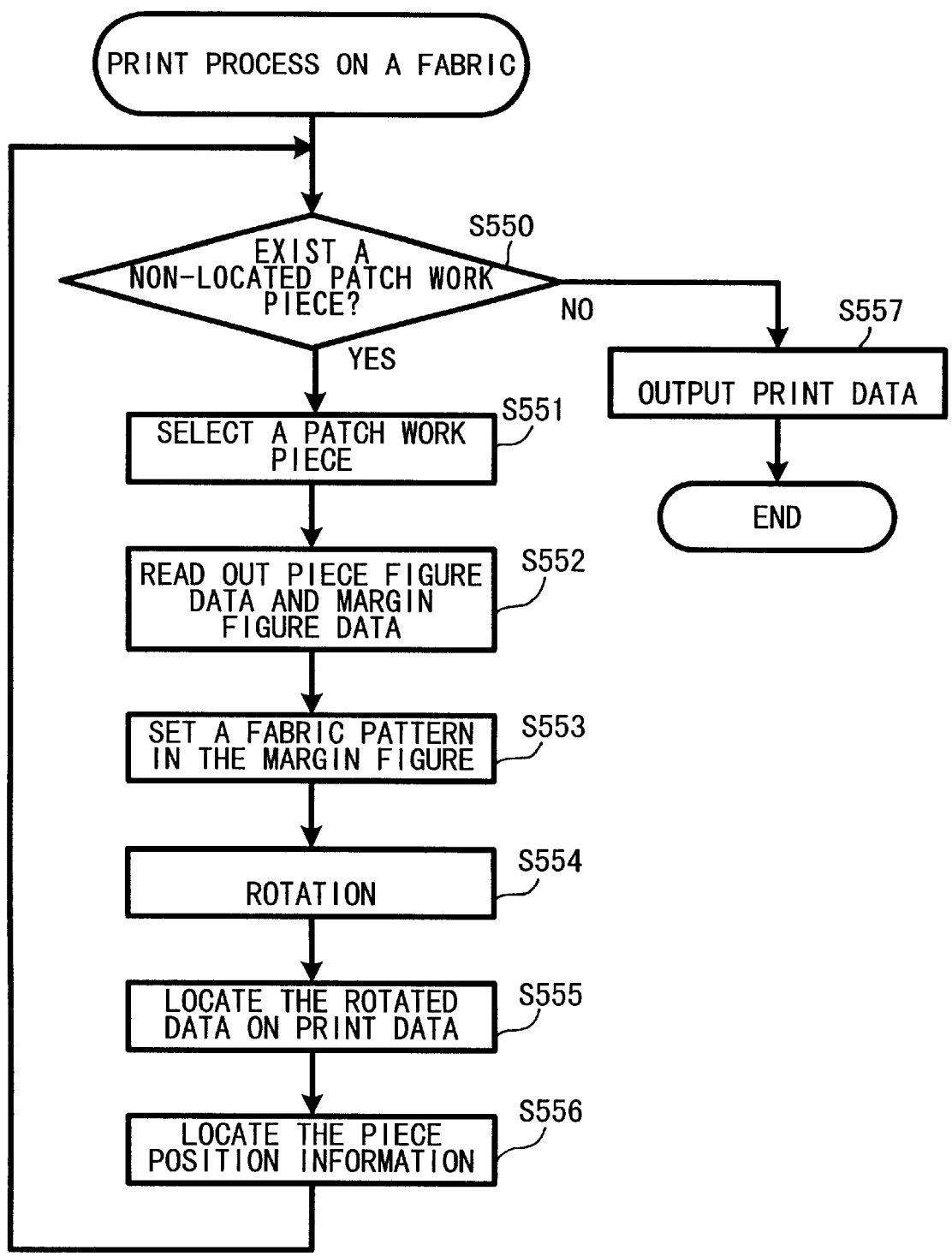
FIG. 9 is a flowchart which shows the fabric printing process.
Figure 14:
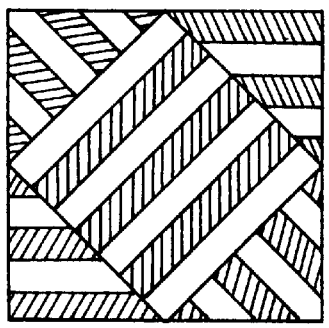
FIG. 14A is a plain view which shows a plan of a completed patch work product.
FIG. 14B is a plain view which shows a fabric print process.
Figure 14:
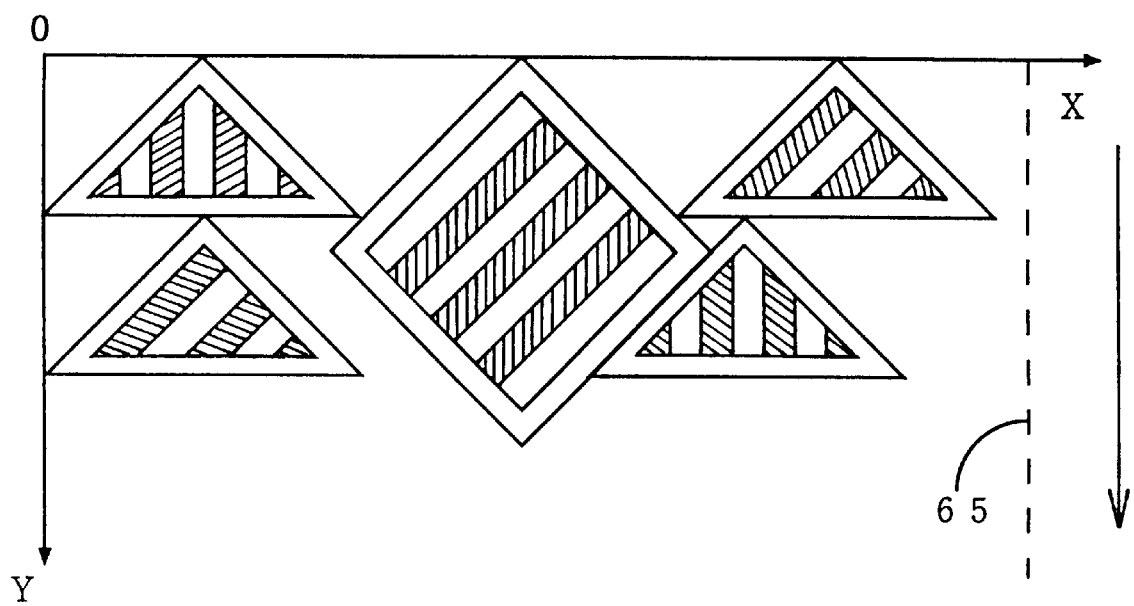

Next, fabric print process (S304) will be described in detail referring to FIGS. 9 and 14A, 14B. In this embodiment, a point of origin O for defining the X-Y coordinates, for the properly positioned print data for basic pattern orientation of the patch work pieces of the patch work piece data 47, at an upper left corner of the pattern to be printed as shown in FIG. 14B. In the X-Y coordinates, the right direction indicates a positive X direction, and the downward direction indicates a positive Y direction. When fabric printer 7 prints a patch work piece on the cloth or the fabric directly, the X direction corresponds to the width direction of the cloth or fabric and the Y direction corresponds to the longitudinal direction of the cloth or fabric. The maximum print area 65, corresponding to cloth or fabric width, is set in advance in the X direction, but maximum print area in Y direction is not set.

When the CPU 1 determines that all of the patch work pieces comprising the patch work piece product are not yet positioned as print data, the CPU 1 repeats the process of S551–S556 (S550:Yes). When the CPU 1 determines that all of the patch work pieces comprising the patch work piece product are positioned as print data (S550:No), the CPU 1 outputs print data to the fabric printer 7 (S557). The fabric printer 7 with input print data from the main device PMD prints out the patch work pieces on the cloth or fabric in accordance with the input print data.

The CPU 1 selects the patch work piece having the smaller coordinate value in the Y direction in patch work piece location in order from non-located patch work pieces in S551. Next, the CPU 1, in S552, reads out piece graphic data 48 and margin graphic data 49 from the patch work piece data 47 of the patch work piece chosen in S551. As for margin graphic data 49, in S553, the CPU 1 fills the inside of the margin figure data 49 with the fabric pattern in accordance with pattern direction data 52 and pattern position data 53 set in patch work piece data 47. Next, the CPU 1, in S554, rotates the edited data in accordance with piece graphic data 48 and positions the rotated data on the print data in S555. The positioning of patch work piece in the print data is at the smallest coordinate value in the X direction of the smallest coordinate value in the Y direction within the locatable range so the position of the new patch work piece does not overlap an already located patch work piece within the area of the fabric width. Finally, the CPU 1, in S556, sets the X-Y coordinate value data of the final position of each patch work piece on patch work piece product as the position information of the patch work piece within the margin area to each located patch work piece and then returns to S550.

The arrow in FIG. 14B indicates the direction in which piece direction data 51 is written or printed. Each patch work piece is rotated so as all of piece direction data 51 indicates a lengthwise grain direction of the fabric (in this embodiment, the grain direction of fabric indicates Y direction).

When fabric printer 7 finishes printing out all the patch work pieces on a cloth or a fabric, the operator cuts out patch work pieces from the cloth or fabric, and the operator sews the patch work pieces. As a result, the patch work piece product which the operator desired will be completed as shown in FIG. 14A.

In this embodiment, positioning information of the patch work pieces is located within the margin area of each patch work piece. However, the positioning information of the patch work pieces may be located near to but outside of the margin area of the concerned patch work piece.

Piece graphic lines may be printed in a color similar to the fabric pattern. Further, piece graphic lines may not be printed on the cloth or the fabric. When the operator sews each patch work piece with the sewing machine using a margin guide device, the piece graphic lines are not necessary. With the margin guide device, the operator can sew each patch work piece easily without piece graphic lines because the operator sews each patch work piece based on a guide line indicating a predetermined margin width of the margin guide device. As a result, the fabric printer 7 must print at least both inside patterns and margin lines for each patch work piece on the cloth or the fabric in this invention.

The invention is not limited to the above-mentioned embodiment. The invention can be changed and modified without departing from the scope of the invention.

For example, in the above embodiment, the piece direction data 51 is set to patch work piece data 47 in the print direction setting process (S510), and the patch work piece which is rotated in accordance with the piece direction data 51 is located on the print data in the patch work piece rotation process (S554). However, the reverse rotation direction data of the pattern direction data which is set in pattern rotation process (S529) of pattern setting process may be used as piece direction data 51 in the piece rotation process (S554).

As another embodiment, because the invention can print the fabric pattern on a paper pattern, a paper pattern can be produced that has shape, size and fabric pattern for subsequent use in a conventional manner, i.e., placing on a fabric and then marking and cutting the fabric. However, because the patch work piece pattern has the fabric pattern printed thereon, orientation is easily obtained simplifying the work.

As yet another embodiment, a translucent or transparent material, such as tracing paper or plastic or resin film, can be used as the paper pattern. With such a pattern material, the operator can see the fabric pattern through the paper pattern thereby facilitating orientation of the paper pattern. Thus, the operator can quickly position the paper pattern relative to the fabric pattern and obtain patch work pieces, that when sewn together, produce the desired patch work piece product.

What is claimed is:

1. An editing device of a patch work piece, comprising:
   image data storage means for storing a plurality of fabric pattern image data;
   patch work piece data storage means for storing patch work piece data having piece graphic data indicating a figure of a patch work piece composing a patch work piece product, margin graphic data indicating a margin set to the patch work piece, and piece pattern data indicating a pattern set to the patch work piece;
   display means for displaying fabric pattern image data stored in the image data storage means and a plan of the patch work piece product produced from the patch work piece data stored in the patch work piece data storage means;
   pattern setting means for setting a fabric pattern chosen from the fabric pattern image data stored in the image data storage means to the patch work piece data stored in the patch work piece data storage means;
   print data creating means for creating a margin figure in which at least an inside of a patch work portion of a patch work piece figure with a margin is filled with the fabric pattern set by the pattern setting means, and for locating the margin figure as print data in accordance with the patch work piece data stored in the patch work piece data storage means; and
   print means for printing the margin figure with the fabric pattern on a thin material based on the edited print data.

2. The editing device of patch work piece according to claim 1, wherein the pattern setting means indicates a location position of each piece of the patch work piece on the fabric pattern image data, and adds the indicated location position to the patch work piece data.

3. The editing device of patch work piece according to claim 1, wherein the pattern setting means indicates a location direction of image data of the fabric pattern for the patch work piece, and adds the indicated location direction to the patch work piece data.

4. The editing device of patch work piece according to claim 1, further comprising patch work piece direction setting means for indicating a location direction of the patch work piece on the print data created by the print data creating means, and adding the indicated location direction to the patch work piece data.

5. The editing device of patch work piece according to claim 3, wherein the print data creating means determines the location direction of the patch work piece data on the print data based on the location direction of image data of the fabric pattern in the patch work piece which is set by the pattern setting means.

6. The editing device of patch work piece according to claim 1, wherein the print data creating means creates at least margin lines and the fabric pattern to be printed by said print means.

7. The editing device of patch work piece according to claim 1, wherein the print data creating means creates piece figure lines with a color similar to the fabric pattern.

8. The editing device of patch work piece according to claim 1, wherein the print data creating means creates print data which includes data concerning the location position of the patch work piece and the margin portion of the patch work piece.

9. The editing device of patch work piece according to claim 1, wherein the print data creating means creates print data which includes data concerning the location position of the patch work piece and an external neighborhood margin portion of the patch work piece.

10. The editing device of patch work piece according to claim 1, wherein the thin material includes a cloth, a fabric, a non-transparent paper, a translucent paper, a transparent film, and a translucent film.

11. The editing device of patch work piece according to claim 6, wherein the thin material includes a cloth, a fabric, a non-transparent paper, a translucent paper, a transparent film, and a translucent film.

12. A recording medium for storing programs to act as an editing device for patch work piece editing of print data for printing each patch work piece composing a patch work piece product on a fabric by using fabric print means, the editing device of the patch work piece having image data storing means for storing fabric pattern image data, patch work piece data storing means for storing patch work piece data having piece graphic data indicating a figure of the patch work piece composing a patch work piece product, margin graphic data indicating a figure of a sewing margin for the patch work piece, piece pattern data indicating a fabric pattern for the patch work piece, and display means for displaying patch work pieces based upon fabric pattern image data stored in an image data storage means and patch work piece data stored in the patch work piece data storage means, comprising:
    a pattern setting program for setting a fabric pattern selected from fabric pattern image data stored in the image data storage device to the patch work piece data stored in the patch work piece data storage device; and
    a print data creating program for creating a margin figure which is filled at least at an inside portion of the margin figure with a fabric pattern set by the pattern setting program in accordance with the patch work piece data stored in the patch work piece data storage means.

13. The recording medium for storing programs according to claim 12, wherein the pattern setting program indicates a location position of the patch work piece on image data of fabric pattern, and adds the indicated location position to the patch work piece data.

14. The recording medium for storing programs according to claim 12, wherein the pattern setting program indicates a location direction of image data of a fabric pattern for the patch work piece, and adds the indicated location direction to the patch work piece data.

15. The recording medium for storing programs according to claim 12, further comprising a patch work piece direction indicating program for indicating a location direction of the patch work piece on print data created by the print data creating program, and adding the indicated location direction to the patch work piece data.

16. The recording medium for storing programs according to claim 15, wherein the print data creating program determines a location direction of the patch work piece data on the print data based on the location direction of the image data of the fabric pattern in the patch work piece which is set by the pattern setting program.

17. The recording medium for storing programs according to claim 12, wherein said print data creating program creates at least margin lines and piece patterns to be printed by the print means.

18. The recording medium for storing programs according to claim 12, wherein the print data creating program creates piece figure lines with a color similar to the fabric pattern.

19. The recording medium for storing programs according to claim 12, wherein the print data creating program creates print data including the data concerning the location position of the patch work piece and a margin portion of the patch work piece.

20. The recording medium for storing programs according to claim 12, wherein the print data creating program creates print data including the data concerning the location position of the patch work piece and an external neighborhood margin portion of the patch work piece.

* * * * *